J. D. CROCKER.
Friction Clutch Pulleys.
No. 139,456.
Patented June 3, 1873.
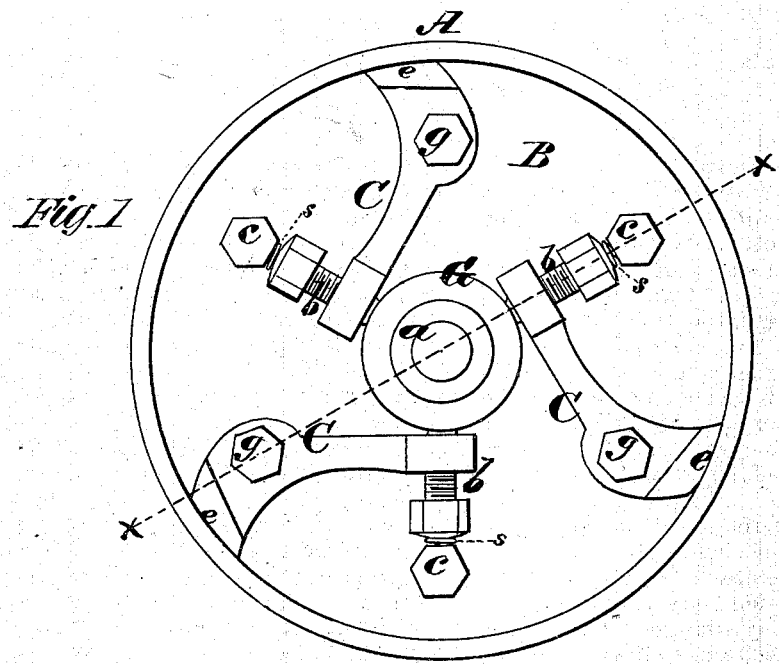
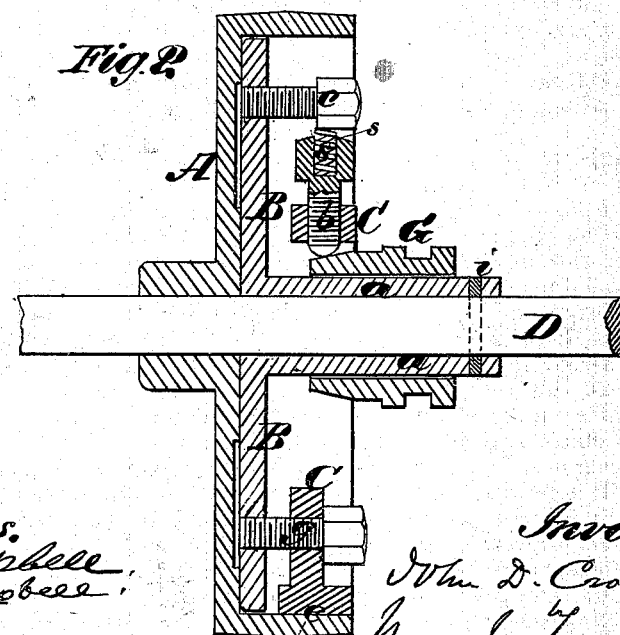

UNITED STATES PATENT OFFICE.

JOHN D. CROCKER, OF NORWICH, CONNECTICUT.

IMPROVEMENT IN FRICTION-CLUTCH PULLEYS.

Specification forming part of Letters Patent No. 139,456, dated June 3, 1873; application filed March 31, 1873.

*To all whom it may concern:*

Be it known that I, JOHN D. CROCKER, of Norwich, in the county of New London and State of Connecticut, have invented an Improved Friction-Clutch Pulley; and I do hereby declare that the following is a full, clear, and exact description thereof, reference being had to the accompanying drawings making part of this specification, in which—

Figure 1 is a view of one face of the pulley, showing the clutches applied to the rim thereof; Fig. 2 is a diametrical section through the pulley, indicated by dotted line $x\ x$ in Fig. 1.

Similar letters of reference indicate corresponding parts in the several figures.

This invention relates to certain novel improvements on friction-clutches for belt-pulleys, wherein I employ a flanged hub, on which a circular sliding wedge is applied for adjusting the clutch or clamping-jaws outwardly against the rim of the pulley for clutching the latter to its shaft, and wherein I also employ independently-adjustable clutching or clamping jaws, which are acted on by springs, as will be hereinafter explained.

The following description of my invention will enable others skilled in the art to fully understand it.

In the accompanying drawings, A represents the pulley, one side of which is closed and constructed with a hub, as shown in Fig. 2, which is applied so as to turn freely on a shaft, D. The inner face of this pulley A is properly faced or smoothed so as to run in slight contact with a correspondingly-smoothed face of a large flange, B, which is formed on a long hub, $a$, and keyed to the shaft D by means of a pin, $i$. In this way the pulley is supported at all times and prevented from wabbling, which it would do after running for a time in consequence of wear. The hub $a$, on which the flange B is formed may be made of any desired length, so as to afford a good bearing or support to its flange, and also to receive upon it a sliding circular annularly-grooved wedge, G, into the groove of which the yoked end of an actuating-lever is received. A portion of the length of the wedge G is tapered, as shown in Fig. 2, and against this tapered or wedge surface the ends of the three set-screws $b$ are pressed by means of springs $s$. The set-screws $b$ are tapped through the inner ends of clutches C, which are pivoted to bosses on the flange B by means of screws $g$, and which present outer convex friction-surfaces $e$, that can be made to bear against the inner surface of the rim of the pulley A. The springs $s$ are recessed into the heads of the screws $b$, and bear against the heads of screws $c$, which are tapped into the flange B. It will be seen from the above description that the friction-surfaces $e$ of the clutches C are all forced simultaneously against the inner surface of the rim of pulley A by moving the sliding wedge G inward or toward the flange B, and that when this wedge is moved in the opposite direction the springs $s$ will withdraw the surfaces $e$ from the rim of pulley A, and allow it to turn freely around its shaft. The wedge G is allowed to turn freely around the hub $a$ of the flange B, so as to preserve a uniform bearing-surface to the ends of the set-screws $b$. It will also be seen that the clutches C can be adjusted by means of the set-screws $b$, so that the friction-surfaces $e$ can be adjusted so as to bear uniformly against the rim of the pulley when pressed against it by the wedge G.

I do not claim clutching devices for pulleys which slide out radially against the inner surface of a flange of the pulley; nor do I claim clutching devices which are caused to slide out radially by means of a pivoted lever, or by means of a cone-wedge; nor do I claim springs applied for bringing the clutching devices back when released from the action of the wedge or levers; nor do I claim a flange on a hub; but—

What I do claim as my invention, and desire to secure by Letters Patent, is—

The pivoted levers C, which are formed with clutching extensions, and are withdrawn from contact with the pulley by springs $s$, in combination with the flanged pulley A, the flange B, hub $a$, and sliding turning-wedge G, substantially in the manner and for the purpose described.

JOHN DENISON CROCKER.

Witnesses:
GEO. A. PRATT,
L. W. PRATT.